United States Patent [19]

Schingnitz et al.

[11] Patent Number: 4,971,550

[45] Date of Patent: Nov. 20, 1990

[54] BURNER WITH ELECTRIC IGNITER FOR GASEOUS FUELS AND OXYGEN

[75] Inventors: Manfred Schingnitz, Freiberg; Wolfgang Seidel, Oberbobritzsch; Christian Reuther, Freiberg; Christian Riedel, Freiberg; Dietmar Degenkolb, Freiberg; Kurt Sterba, Freiberg, all of German Democratic Rep.

[73] Assignees: Brennstoffinstitut Freiberg, Freiberg, German Democratic Rep.; Deutsche Babcock Weeke Aktiengesellschaft, Oberhausen, Fed. Rep. of Germany

[21] Appl. No.: 414,904

[22] Filed: Sep. 29, 1989

[30] Foreign Application Priority Data

Oct. 12, 1988 [DD] German Democratic Rep. ... 320663

[51] Int. Cl.⁵ ................................................. F23Q 2/00
[52] U.S. Cl. .................................... 431/143; 431/258; 431/262; 431/264
[58] Field of Search ............... 431/143, 258, 262, 264, 431/93

[56] References Cited

U.S. PATENT DOCUMENTS

| | | | |
|---|---|---|---|
| 2,966,942 | 1/1961 | Breese et al. | 431/263 X |
| 4,494,923 | 1/1985 | Guillaume et al. | 431/264 X |
| 4,595,353 | 6/1986 | de Haan | 431/263 |
| 4,746,285 | 5/1988 | Guerra | 431/258 X |

Primary Examiner—Larry Jones
Attorney, Agent, or Firm—Max Fogiel

[57] ABSTRACT

A burner with an integrated electrical high-voltage igniter and a flame monitor for partly oxidizing gaseous fuels in reactors that are either pressurized or not. A fuel-gas channel communicates with a confusor which opens into an annual fuel-gas nozzle. The fuel-gas channel, furthermore, is surrounded by an annular oxygen channel. Water channels border the confusor and the annular fuel-gas nozzle. The annular fuel-gas nozzle, moreover, has the confusor, and annular nozzle with a reaction zone end, and a diffusor. This diffusor merges into the oxygen channel at an axially parallel radius of curvature. A high-voltage ignition cable extends through the fuel-gas channel and terminates in a metal electrode which is positioned so as to form a spark gap in a space between the tip of the electrode and a metal wall of the burner. In this space within the spark gap, the fuel gas and oxygen mixture is turbulent, whereby the fuel-gas channel provides a reliable and certain ignition of the fuel gas and oxygen mixture independent of gas pressure in that space. The radius of curvature is located at an exit end of the diffusor and extends into the oxygen channel for separation of gas from walls of the diffusor to produce a vacuum in the spark gap space for suctioning the oxygen from the oxygen channel.

3 Claims, 1 Drawing Sheet

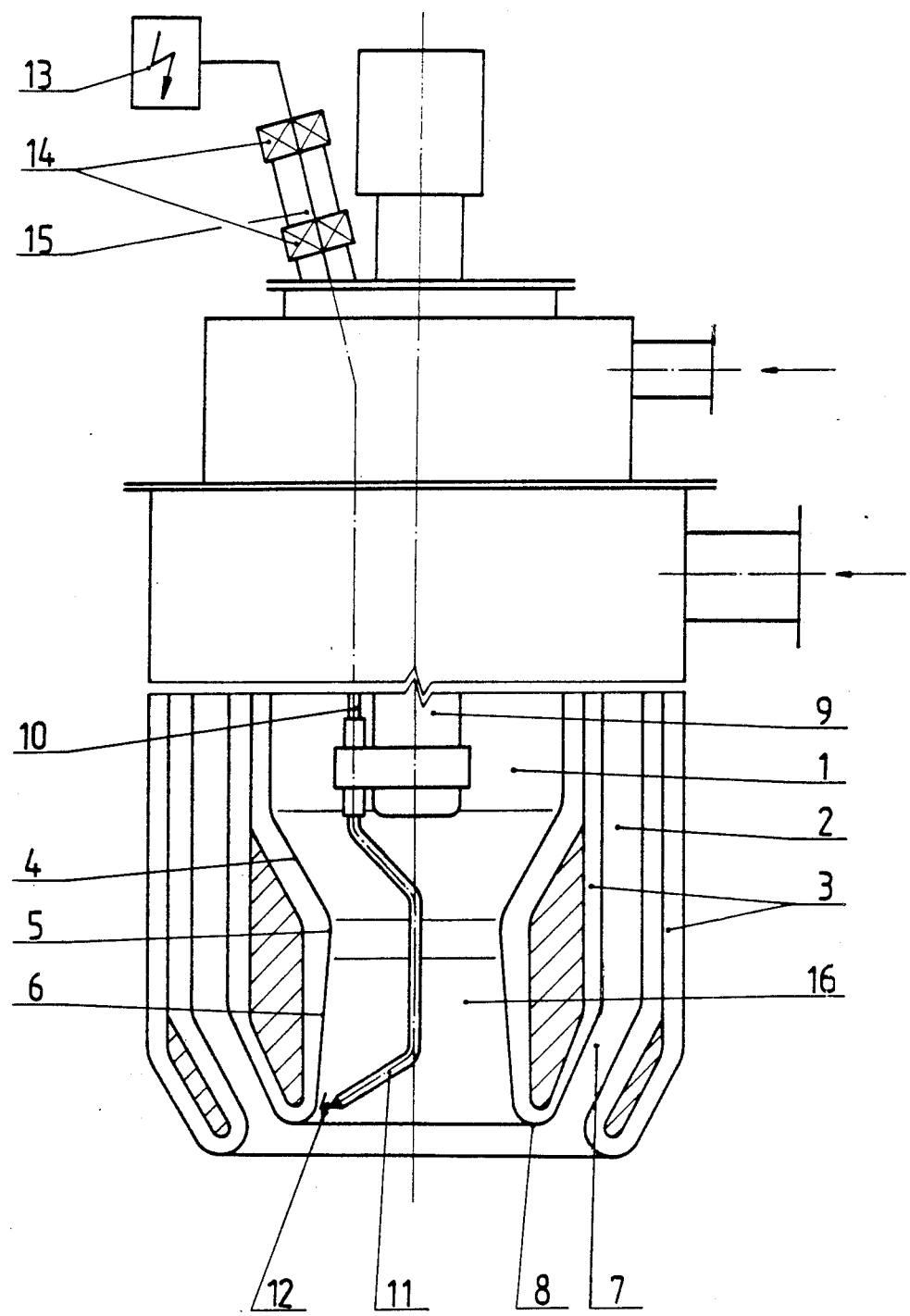

BURNER WITH ELECTRIC IGNITER FOR GASEOUS FUELS AND OXYGEN

BACKGROUND OF THE INVENTION

The invention concerns a burner with an integrated electric igniter and a burner-flame monitor for gaseous fuels and oxygen. One field of application for the burner is to generate gases that contain CO and $H_2$ by partly oxidizing gaseous hydrocarbons in a pressurized reactor. Another application for the burner is as a pilot or backup burner in a reactor for gasifying powdered and/or liquid fuels by partly oxidizing them with oxygen. The resulting CO—and $H_2$-containing gases are employed as synthesis, hydrogenation, municipal-supply, and metallurgical-reduction gases and for similar purposes.

DD Patent No. 241 457 describes a generic burner for partly oxidizing gaseous hydrocarbons into gases that contain CO and $H_2$ in a pressurized reactor. An ignition pipe is positioned in a fuel-gas channel, is electrically insulated from the metal wall of the channel, and is connected to the high-voltage end of an electric high-voltage igniter. The end of the igniter that is inside the channel and faces the reaction zone has a pin-type electrode aimed at the wall of the channel, creating a spark gap. The ignition pipe also communicates by way of a shut-off valve with a source of oxygen and has oxygen outlets in the vicinity of the spark gap.

The burner's fuel-gas channel consists of a cylindrical section followed toward the reaction zone by a confusor and by a narrower cylindrical fuel-gas outlet nozzle. The fuel-gas channel is demarcated by the metal wall from a surrounding annular oxygen channel, and the ignition pipe is positioned eccentrically in the channel with its reaction-zone end and electrode upstream of the fuel-gas outlet nozzle.

Some of the outlets in the ignition pipe are upstream of the electrode and face the metal channel wall. Since the reaction-zone end of the ignition pipe also has outlets, some of the oxygen leaves the radial axially.

One drawback of an igniter accommodated inside the fuel-gas channel in this way is that it cannot be employed to ignite the actual burner flame, but only an ancillary flame that itself then ignites the main flame. Since oxygen must be introduced into the fuel-gas channel to generate the ancillary flame, explosive ignition and local overheating, leading to premature wear, cannot be ruled out.

The need to ignite an ancillary flame also increases the number of sources of malfunction that can occur as the system is started up and accordingly limits its reliability.

Another drawback of this approach is that it necessitates an additional oxygen intake for igniting the flame. Although this intake is active only during the ignition, it must still be sealed off from the atmosphere and monitored at the pressure end, endtailing additional expenditures for machinery and safety engineering.

The system described in DD WP 241 457 can also be started up by the igniter in the fuel-gas channel only once the reactor has been depressurized, which also limits its application.

SUMMARY OF THE INVENTION

The object of the present invention is to develop a burner that complies with the strict safety standards characteristic of the industrial-scale part oxidation of gaseous hydrocarbons, that includes a simpler and easier to manufacture igniter, and that has a wider range of application.

This object is attained in a burner with an integrated electric igniter and a burner-flame monitor, especially for pressurized reactors for generating gases that contain CO and $H_2$ by part oxidation, operated with gaseous fuel and oxygen, whereby the reactor is either pressurized or not.

The point of departure for the invention is a burner with coaxial fuel-gas and oxygen channels that open into the reaction zone and are demarcated by or accommodated in channels that water flows through. One fuel-gas channel accommodates, in accordance with the invention, an ignition cable that is connected to a high-voltage igniter outside the burner. The end of the cable toward the reaction zone terminates in a metal electrode that extends to the end of the burner, where it creates a spark gap in relation to the metal wall of the channel.

The electrode of the burner in accordance with the invention extends inside the fuel-gas channel through a fuel-gas nozzle that consists of a confusor, an annular nozzle, and a diffusor, and creates a spark gap in conjunction with the metal wall of the channel at the axially parallel radius of curvature of the diffusor, in the vicinity, that is, of the turbulence that consititutes the transition into the oxygen channel.

The metal electrode is positioned in accordance with the invention where it can not only directly ignite the contents of the fuel-gas and oxygen channel but is also cooled off by the arriving fuel gas to the extent that the heat radiating out of the reaction zone will not damage it.

Also characteristic of the invention is that the high-voltage ignition cable enters the burner through two separate seals. The resulting pressure-tight volume is exploited as a safety zone to prevent gas leaks by turning off the burner when the pressure increases even slightly. The separate pressurized volumes are sealed off with spark plugs, with the high voltage simultaneously traveling through their metal leads.

The design of the burner in accordance with the invention results in an output-control range of 1:15. It accordingly becomes possible to use fuel gases with different calorific values without intervening in the structure.

One emboidment of the invention will now be described with reference to the drawing.

BRIEF DESCRIPTION OF THE DRAWING

An elevational view, partly in section, showing the essential elements in accordance with the present invention.

DESCRIPTION OF THE PREFERRED EMBODIMENTS

The burner comprises a central cylindrical fuel-gas channel 1, an annular oxygen channel 2, and walls 3 that have water flowing through them.

The fuel gas flows into the reaction zone through central fuel-gas channel 1, a subsequent confusor 4, an annular nozzle 5, and a diffusor 6. The oxygen arrives in the reaction zone by way oxygen channel 2 and of an annular space 7 coaxial thereto. The fuel gas comes into contact with the oxygen at a radius 8 of curvature created by diffusor 6 and 7. Along the axis of fuel-gas channel 1 is a flame monitor 9. A high-voltage ignition cable 10 is secured to the housing of monitor 9. The end of cable 10 terminates in a metal electrode 11. Electrode 11 has a special shape, extending toward and then along the axis of the burner, with its free end bent toward radius 8 of curvature. The electrode is positioned such as to leave a spark gap 12 between its tip and the metal wall at radius 8 of curvature. The high voltage needed to produce a spark is generated in a transformer 13 and introduced into fuel-gas channel 1 by way of high-voltage ignition cable 10. The tightness of the burner in relation to the reaction zone is ensured by two pressure-resistant seals 14 that mutually demarcate another tight zone 15 constituting a safety zone.

The burner's operation will now be described.

When the pressure in the reaction zone is atmospheric or higher, a specific volume of oxygen or of a mixture of oxygen and steam will flow into the reaction zone by way of oxygen channel 2 and annular space 7. It is encountered by an equal volume of fuel gas flowing through fuel-gas channel 1 and through a fuel-gas nozzle 16 that consists of confusor 4, annular nozzle 5, and diffusor 6. A spark is created simultaneously with the introduction of the fuel gas and ignites the combustible mixture of fuel gas and oxygen in the vicinity of radius 8 of curvature.

The fuel-gas nozzle 16 that comprises confusor 4, annular nozzle 5, and diffusor 6 constantly varies the speed of the fuel gas and accordingly augments the effect of the turbulence at radius 8 of curvature, ensuring direct ignition in that vicinity.

Once the burner flame has been ignited, the transformer is turned off and the reactor is operated at operating pressure.

The special position of electrode 11 along the axis of the fuel-gas channel allows it to be cooled by the fuel gas that flows in when the flame is burning, protecting the electrode from the heat radiating out of the reaction zone. The current of fuel gas simultaneously prevents solid particulate contaminants from the reaction space from penetrating into the flame monitor. The burner described herein is employed as a pilot burner in a reactor that partly oxidizes coal dust. The axially symmetrical position of the burner allows introduction of coal dust and of the mixture of oxygen and steam employed as a gasification agent either by way of separate openings positioned concentric around the burner or by way of additional annular channels around the burner itself. The annular openings around the pilot burner result in a uniform and compact device for burning a combination of coal dust and fuel gas.

What is claimed:

1. A burner comprising: an integrated electrical high-voltage igniter and a flame monitor for partly oxidizing gaseous fuels into gases containing CO and $H_2$ in reactors hat can be pressurized; a fuel-gas channel with a cylindrical section; a confusor communicating with said fuel-gas channel; an annular fuel-gas nozzle, said confusor opening into said annular fuel-gas nozzle; an annular oxygen channel surrounding said cylindrical section of said fuel-gas channel; water channels with water flowing therethrough bordering said confusor and said annular fuel-gas nozzle; said annular fuel-gas nozzle comprising said confusor, and a diffusor; said reaction-zone end merging into said diffusor, and said diffusor merging into said oxygen channel at an axially parallel radius of curvature; said oxygen channel surrounding coaxially said fuel-gas nozzle; a high-voltage ignition cable extending through said fuel-gas channel and terminating in a metal electrode; said ignition cable being positioned for orienting a spark gas in a space between said electrode and a metal wall of said burner, a fuel gas and oxygen mixture being turbulent in said space, said fuel-gas channel providing reliable and certain ignition of the fuel gas and oxygen mixture independent of gas pressure in space; said radius of curvature being at an exit end of said diffusor and extending into said oxygen channel for forced separation of gas from walls of said diffusor to produce a vacuum in said space for suctioning the oxygen from said oxygen channel, said electrode having a tip lying opposite said radius of curvature to form said spark gap within said vacuum in said space.

2. A burner as defined in claim 1, including two separate pressure-resistant seals forming a pressure-tight zone for preventing leakage of fuel gas and being thereby safety means, said high-voltage ignition cable extending into and through said two separate pressure-resistance seals.

3. A burner comprising: an integrated electrical high-voltage igniter and a flame monitor for partly oxidizing gaseous fuels into gases containing CO and $H_2$ in reactors that can be pressurized; a fuel-gas channel with a cylindrical section; a confusor communicating with said fuel-gas channel; an annular fuel-gas nozzle, said confusor opening into said annular fuel-gas nozzle; an annular oxygen channel surrounding said cylindrical section of said fuel-gas channel; water channels with water flowing therethrough bordering said confusor and said annular fuel-gas nozzle; said annular fuel-gas nozzle comprising said confusor, and a diffusor; said reaction-zone end merging into said diffusor, and said diffusor merging into said oxygen channel at an axially parallel radius of curvature; said oxygen channel surrounding coaxially said fuel-gas nozzle; a high-voltage ignition cable extending through said fuel-gas channel and terminating in a metal electrode; said ignition cable being positioned for orienting a spark gap in a space between said electrode and a metal wall of said burner, a fuel gas and oxygen mixture being turbulent in said space, said fuel-gas channel providing reliable and certain ignition of the fuel gas and oxygen mixture independent of gas pressure in space; said radius of curvature being at an exit end of said diffusor and extending into said oxygen channel for forced separation of gas from walls of said diffusor to produce a vacuum in said space for suctioning the oxygen from said oxygen channel, said electrode having a tip lying opposite said radius of curvature to form said spark gap within said vacuum in said space; a flame monitor with a housing located along an axis of said fuel-gas channel, said high-voltage ignition cable being secured to said housing of said monitor; said electrode having a predetermined shape extending toward and along an axis of said burner, said electrode having a free end bent toward said radius of curvature, said electrode being positioned so as to leave said spark gap between the tip of said electrode and said metal wall at said radius of curvature; two separate pressure-resistant seals forming a pressure-tight zone for preventing leakage of fuel gas and thereby comprising a safety zone; a predetermined volume of oxygen flowing into said reaction zone though said oxygen channel when pressure in said reaction zone is at least atmospheric, fuel gas in equal volume as said oxygen flowing through said fuel-gas channel and through said fuel-gas nozzle to mix with said predetermined volume of oxygen, said fuel-gas nozzle varying constantly speed of the fuel gas for regulating turbulence at said radius of curvature for direct ignition in said space; said electrode being positioned along an axis of said fuel-gas channel for cooling said electrode by flow of said fuel gas when a flame is burning to protect the electrode from heat radiating out of said reaction zone, the flow of fuel gas preventing simutaneously solid particulate contaminants from penetrating into said flame monitor from said reaction zone.

* * * * *